April 1, 1952
F. W. SCHNEPEL
2,591,204
FISHING REEL
Filed May 18, 1949
2 SHEETS—SHEET 2
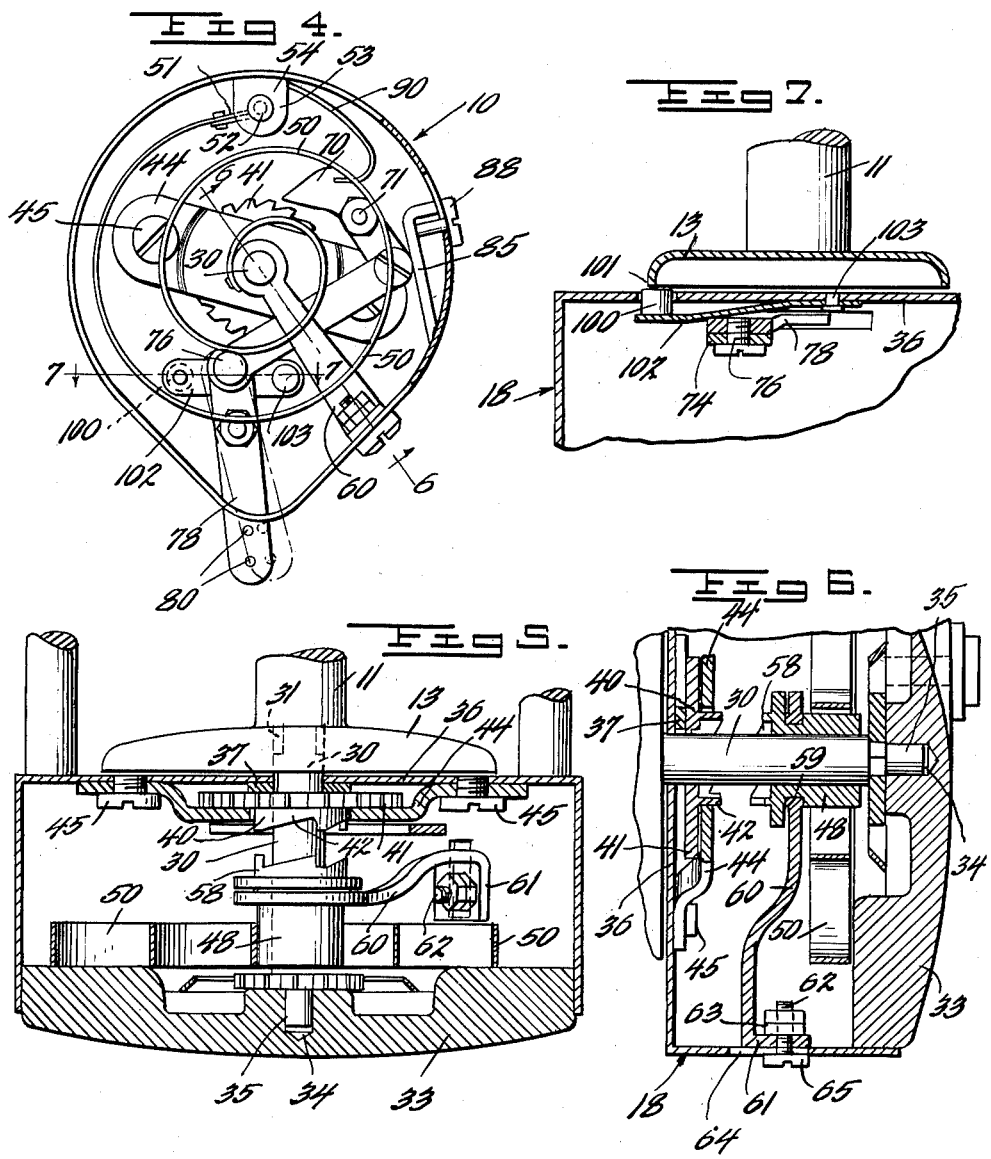
INVENTOR.
Frederick W. Schnepel
BY Watson, Cole, Grindle & Watson
ATTORNEYS Patented Apr. 1, 1952

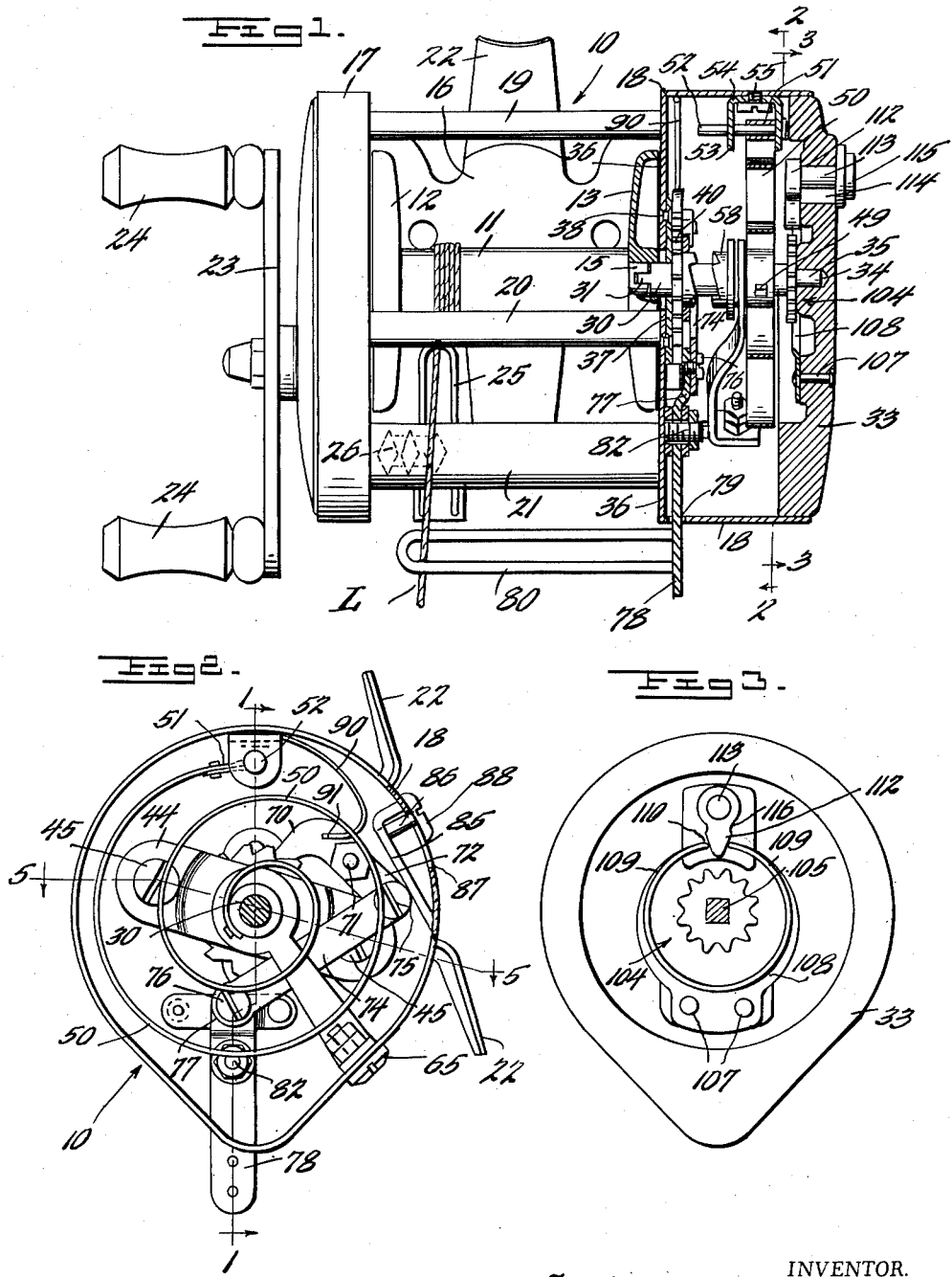

2,591,204

UNITED STATES PATENT OFFICE 2,591,204

FISHING REEL

Frederick W. Schnepel, Elmira, N. Y.

Application May 18, 1949, Serial No. 93,940

12 Claims. (Cl. 242—84.3)

This invention relates to fishing reels and more particularly to reels embodying auxiliary mechanism adapted to facilitate the various operations associated with casting, trolling, or still fishing; such as, making a cast, snagging the fish, playing the fish, and reeling in.

The general object of the invention is to provide a novel and improved reel of the class described which is of relatively simple construction, easy to operate, and not liable to get out of order and require frequent repair. The novel features of the present invention may be incorporated in a complete reel assembly for application to a fishing rod, or they may be embodied in an attachment which may be applied to existing reels of conventional construction.

In its preferred embodiment the invention contemplates the provision of a reel assembly in which the winding of the reel may be alternatively placed under the control of a spring device or of the usual manual crank. A pawl and ratchet device is employed for holding or locking the reel proper against winding in, especially as opposed to the winding force of the spring device, this pawl and ratchet device being quickly releasable either by hand or by the fish when it bites or strikes.

One of the important features of novelty and ingenuity presented by this invention is the versatility of the reel assembly with regard to the choice of means for retarding the paying out of the line, as for example while playing the fish. Besides the usual click or casting ratchet, the spring device and the pawl and ratchet device already mentioned may be used for this purpose, as well as a novel friction brake associated with the holding pawl and capable of being similarly actuated, either manually or by the fish itself when the line is properly threaded through the operating linkage provided for this purpose.

Other objects and features of novelty will be apparent from the following specifications when read in connection with the accompanying drawings in which one embodiment of the invention is illustrated by way of example.

In the drawings:

Figure 1 is a view in elevation of a fishing reel embodying the principles of the invention, certain of the operating and controlling parts being shown in section;

Figure 2 is a view in vertical section of the reel taken substantially on line 2—2 of Figure 1, looking in the direction of the arrows;

Figure 3 is a view in vertical section taken substantially on line 3—3 of Figure 1 and looking in the opposite direction from the view-point of Figure 2;

Figure 4 is a sectional view similar to Figure 2 but showing the holding pawl in released or disengaged position;

Figure 5 is a sectional view on an enlarged scale taken substantially on line 5—5 of Figure 2;

Figure 6 is a similar view taken substantially on line 6—6 of Figure 4; and

Figure 7 is a fragmentary enlarged sectional view taken substantially on line 7—7 of Figure 4.

The novel fishing reel as a whole is designated generally by the reference numeral 10 and comprises the reel proper 11 having the end flanges 12 and 13, these parts being mounted upon and secured to the axle or shaft 15. The reel proper is mounted for rotation within the framework which comprises a base member 16 to which is secured the driving gear housing or casing 17 and the casing 18 for enclosing the novel control mechanism, these casings being further braced by the transverse rods 19 and 20 and the tubular shaft housing 21. The housing 17 contains the usual reduction gearing whereby the reel 11 is rotated in either direction by means of the hand crank 23 to which the handles or finger grips 24 are applied. The base member 16 is provided with concaved extensions 22 for attachment to the fishing rod.

Conventional line traversing mechanism is provided and this consists of the traversing loop 25 which is associated with the reverse threaded shaft enclosed in the tubular housing 21 and suggested at 26. A suitable nut, not shown, rides upon this shaft and carries the traversing loop 25 back and forth across the reel.

An extension shaft 30 is formed with interlocking parts, as at 31, adapted to connect it end to end with the shaft 15. The housing or casing 18 is closed at its outer end by a cap member 33 which may conveniently be made of plastic, hard rubber, or any other suitable material. Centrally of the cap 33 is a bearing recess 34 adapted to receive the attenuated end 35 of the shaft extension 30. The inner wall 36 of the casing 18 is perforated centrally for the passage of the shaft extension 30 and is strengthened at that point by the bridging plate 37 which is provided with a central opening offering a reinforced bearing for the shaft extension 30. The plate 37 is preferably secured to the wall 36 by means of the rivets 38.

Keyed or otherwise securely mounted upon the shaft extension 30, adjacent its inner end, is the combined ratchet and clutch member 40. This member is provided with a ratchet wheel 41 and a serrated jaw clutch half 42. This member rotates with the shaft extension 30 and is disposed between the plate 37 and the retaining or bridging plate 44, which plate has an offset intermediate portion embracing the ratchet wheel 41 and provided with an opening for the clutch portion 42, the ends of the plate 44 being secured to the housing wall 36 as by means of the screws 45.

A tubular member 48 is slidably and normally rotatably mounted upon the shaft extension 30, this member being provided with anchoring means 49 for the inner portion of the convolute spring 50. The outer end of the spring 50 is formed with a loop 51 which engages around the pin 52 which passes through registering openings in the ears 53 of the clip 54 which is mounted for swivelling movement with relation to the casing 18 by means of the screw 55.

The inner spring-attached member 48 is provided with a clutch half 58 adapted to interlock with the clutch half 42 carried by the member 40 which is keyed to the shaft extension 30. The member 48 is provided with a groove 59 which is embraced by an opening in the end of the clutch controlling arm 60. The outer end of this arm is provided with an angular flange 61 which is disposed for adjusting along the wall of the housing 18 so as to move the tubular spring carrying member 48 axially of the shaft extension 30 so as to bring the clutch parts 42 and 58 into interlocking engagement and thus bring the reel 11 under the control of the spring 50. The end flange 61 of the controlling element 60 is provided with a bolt 62 which carries the locked nuts 63. The bolt 62 passes through the transverse slot 64 in the wall 18 of the housing and the bolt head 65 overlies the margins of the slot and provides thumb actuatable means for moving the spring clutch operator 60.

It will be seen that when the clutch parts 42 and 58 are engaged, the unwinding of the reel and the paying out of the line will wind up the spring 50 and thus exert a resilient resistance to the paying out of the line. It will be noted that the space between the ears 53 of the spring retaining swivel clip is somewhat wider than the width of the spring 50 and this permits some slight lateral adjusting movement of the spring on the pin 52. The swivelling of the clip 54 also aids in adapting the spring to the shifted positions of its inner end according to the movements of the tubular member 48.

Associated with the holding ratchet 41 carried by the member 40 and keyed to the shaft extension 30, is the locking pawl 70, the nose of which is adapted to enter the notches in the ratchet 41 and engage the teeth to prevent rotation thereof in the reeling-in direction, and therefore in the direction in which the spring 50 tends to urge the reel when the latter is clutched to the shaft extension. The pawl 70 is fulcrumed upon the pin 71 which may be secured to the inner wall 36 of the housing 18. The shank end 72 of the pawl member 70 is pivotally secured to a link 74 as by means of the screw 75. The other end of the link 74 is pivoted by means of the screw 76 to the slightly offset end 77 of the lever arm 78 which passes through an opening 79 in the housing 18 and carries adjacent its end the elongated loop 80. The lever 78 is fulcrumed upon the screw or stub shaft 82 secured to the housing.

A pawl operating element is provided for manual operation and comprises the angular piece 85 disposed interiorly of the arcuate wall of the casing 18, the ends of the arms of the angle piece 85 being adapted to bear upon the inner surface of the wall. A screw 86 is threaded into the piece 85 and extends through a slot 87 in the wall, the head 88 serving as a thumb-operated element for sliding the part 85. The longer arm of the element 85 bears against the shank end 72 of the pawl 70 and as the piece 85 moves around the inner curvature of the wall 18 it depresses the shank 72 and raises the nose of the pawl 70 out of engagement with the ratchet wheel 41, this being accomplished against the urging of the spring element 90, which has one end secured to the wall of the housing 18 in any suitable way and has its curved inner end 91 bearing against the pawl to urge it into engagement with the ratchet.

By reference to Figures 2, 4, and 7 of the drawings it will be perceived that there is provided a brake plunger 100 which is adapted to bear against the peripheral edge 101 of the end flange 13 of the reel 11. This brake plunger 100 is carried upon the end of a spring arm or blade 102, the opposite end of which is fulcrumed to the wall 36 of the housing 18 as by means of the screw or rivet 103. The spring arm 102 is biased outwardly away from the wall 36 so that the brake 100 is normally urged away from engagement with the flange surface 101. The curved spring arm 102 is disposed directly opposite the junction or pivot point 76 between the link 74 and the control lever 78, the lever 78 bearing, in the illustrated embodiment, against the spring arm.

The proportions and relationships of the parts of the linkage extending from the arm 78 to the pawl 70 are such that during the movement of the pawl (by means of the member 85) from full engagement with the ratchet 41 to the position shown in Figure 4 in which it is just free from such engagement, the brake arm 102 is not depressed to full contact of the brake element 100 with the flange 13. However, further movement of the linkage by movement of the lower end of the actuating arm or lever 78 to the right (in Figures 2 and 4) causes the lever 78 to slide along the inclined brake arm 102 and cause the brake shoe or plunger 100 to press against the flange edge 101 of the reel and apply increasing pressure to frictionally retard rotation of the reel.

Both the releasing of the pawl 70 and the application of the brake 100 may be accomplished by the action of the fish itself, when the line L is threaded through the loop 80 after passing through the traversing loop 25. It will be readily understood that pressure of the line against the loop 80 will cause the lever 78 to angle, releasing the pawl 70 and thereafter applying the brake 100 to the reel. Alternatively, the lever 78 can be manipulated by the hand of the fisherman to release the pawl and/or apply the brake.

A click or casting ratchet device is provided on the inner face of the cap 33 and is designated generally by the reference numeral 104. A portion of the shaft extension 30 inwardly of the bearing end portion 35 is squared as at 105 and carries rigidly thereon the click ratchet wheel or star wheel 106. Riveted as at 107 to the inner cupped face of the cap 33 is the spring jaw member 108, the semi-circular arms 109 of which terminate at the gap 110 into which the ratchet dog 112 extends. This ratchet dog is carried upon a pin 113 which passes through the slot 114 and carries upon its outer end the dog actuating button 115. The dog 112 inwardly from the nose thereof is provided with oppositely disposed notches or indentations 116 into which the ends of the spring arms 109 are adapted to spring when the dog is depressed so that its nose engages the notches in the star wheel 106. When thus engaged, the spring pressed dog will exert a certain retarding influence upon the reel, especially when engaged during unwinding movement, and will also cause an audible signal whereby such unwinding or paying out movement may be readily detected.

The operation of the novel reel device in connection with various types of fishing will now be described. In the case of ordinary still fishing, the line L is threaded through both the traversing loop 25 and the braking loop 80 and the click device 104 may be either thrown into or out of operation as desired. When the line is thrown out, all of the various controls may be disengaged or placed in "neutral." That is, the button 88 is moved to the position shown in Figure 4 releasing the pawl 70 but not moving the linkage so far as to apply the brake 100. The clutch button 65 is disposed in the position shown in Figure 6 whereby the spring 50 is unclutched from the reel. When the line is out the spring clutch is moved into engagement and the reel is then rotated as far as it will go by hand, thus tensioning the spring substantially to its limit. When the spring is wound up, the pawl 70 is engaged by movement of the button 88 to the position shown in Figure 2. When the pawl is engaged, the brake 100 is of course free from contact with the lever 78 and is of course in inoperative position. When the fish strikes the bait, the pressure on the line against the loop 80 causes the linkage 73, 74 to trip the pawl from engagement with the ratchet 41 and the spring 50 then comes into action and rotates the reel rapidly, jerking on the line and securing the fish upon the hook. Now when the fish is being played, he may be fought by either the tension of the spring 50 or the friction of the brake 100, or the use of both factors. The spring may be thrown into or out of action by the clutch thumb piece 65 and the brake may be applied by the pressure of the line against the lever 78, or further manipulated by the pressure of the thumb or finger of the fisherman upon this lever. The use of the click 104 is optional. After the fish is securely caught and subdued, the line may be fully reeled in and of course when the reel-attached clutch half 42 overruns the clutch half 58, the clutch is automatically disengaged and the spring action disconnected from the reel.

In trolling, the line is preferably passed through the traversing eye or loop 25 only and not through the brake loop 80. The use of the click is optional. With the line out, the pawl 70 is engaged and the spring clutch is also engaged, the reel thus being "locked," the brake of course being off. When the fish bites, the pawl 70 is positively disengaged by actuating the button 88. The spring 50 then jerks the line in and the fisherman may then continue to reel in the line, the overrunning of the reel serving to automatically disengage the clutch spring.

In casting, the fisherman can use the traversing loop 25 alone, or he may also use the brake loop 80. In the former case, in making the cast, the pawl 70 is disengaged but the brake 100 is off. The spring clutch is also disengaged and the click may be on or off as desired. Upon a strike, the spring clutch is immediately engaged by the movement of the button 65, the running of the fish serving to wind up the spring. Thus the fish may be fought by the spring pressure alone and ultimately when reeled in, the spring clutch will be disengaged.

Alternatively, when the brake loop 80 is used in casting, the spring may be employed during the initial portion of the playing of the fish, and then when the fish breaks water, the spring may be released and the fish then allowed to apply the brake.

Various changes and modifications may be made in the illustrated embodiment and the operation thereof without departing from the scope of the invention as determined by the subjoined claims.

Having thus described the invention, what is claimed as new and desired to be secured by Letters Patent is:

1. A fishing reel assembly of the class described comprising, in combination, a supporting frame adapted to be attached to a fishing rod or the like, a reel rotatably mounted on said frame and adapted to carry the fishing line, a hand crank and means operatively connecting said crank to said reel for rotating it in either reeling-in or paying-out directions, pawl and ratchet means engageable at will for preventing rotation of the reel in the reeling-in direction and spring means engageable with said reel and adapted to be stressed to urge the reel in the reeling-in direction, said pawl and ratchet means serving to set the reel against reeling in and in opposition to the tension of the spring means, and means for tripping the pawl and ratchet means upon the tautening of the line to a predetermined extent by a catch to permit the spring to suddenly actuate the reel to reel in the line, braking means for frictionally retarding the paying-out movement of the reel, means affording further movement of said tripping means beyond that necessary to disengage the pawl, means on said braking means engageable by said tripping means during such further movement, whereby said automatic tripping means also serves to apply said braking means upon further tautening of the line.

2. A fishing reel assembly of the class described comprising, in combination, a supporting frame adapted to be attached to a fishing rod or the like, a reel rotatably mounted on said frame and adapted to carry the fishing line, a hand crank and means operatively connecting said crank to said reel for rotating it in either reeling-in or paying-out directions, pawl and ratchet means engageable at will for preventing rotation of the reel in the reeling-in direction and spring means engageable with said reel and adapted to be stressed to urge the reel in the reeling-in direction, said pawl and ratchet means serving to set the reel against reeling in and in opposition to the tension of the spring means, and means for tripping the pawl and ratchet means upon the tautening of the line to a predetermined extent by a catch to permit the spring to suddenly actuate the reel to reel in the line, braking means for frictionally retarding the paying-out movement of the reel, means affording further movement of said tripping means beyond that necessary to disengage the pawl, means on said braking means engageable by said tripping means during such further movement, whereby said automatic tripping means also serves to apply said braking means upon further tautening of the line, and manually operable means for tripping said pawl and ratchet device to the extent of disengaging the pawl but inoperative to apply the braking means.

3. A fishing reel assembly of the class described comprising, in combination, a supporting frame adapted to be attached to a fishing rod or the like, a reel rotatably mounted on said frame and adapted to carry the fishing line, a hand crank and means operatively connecting said crank to said reel for rotating it in either reeling-in or paying-out directions, an axial extension rigid with said reel and adapted to rotate therewith, a ratchet wheel fixed directly on said extension, a pawl pivotally mounted on said frame and adapted to be brought into and out of engagement with said ratchet wheel to respectively prevent and permit rotation of the latter and of the reel in the reeling-in direction, manually operable means in permanent operative connection with said pawl for removing the latter from engagement with said ratchet wheel, means separate from said reel directly connected with said pawl, and adapted to be actuated by the tautening of the line for automatically removing said pawl from engagement with said ratchet wheel, means pivoting the pawl to said frame, said manually operable means including a cam movably supported by the frame and adapted to be moved against the pawl by the fingers of the fisherman, the automatically actuated means comprising a lever operatively connected with the pawl and with the fishing line, a brake element supported by said frame for movement into and out of frictional contact with a portion of the rotatable reel, said brake element being disposed in the path of movement of the said lever beyond the extent of its movement necessary to disengage the pawl, whereby after the pawl is removed from engagement with the ratchet wheel, continued movement of the lever applies the brake to the reel.

4. A fishing reel assembly of the class described comprising, in combination, a supporting frame adapted to be attached to a fishing rod or the like, a reel rotatably mounted on said frame and adapted to carry the fishing line, a hand crank and means operatively connecting said crank to said reel for rotating it in either reeling-in or paying-out directions, an axial extension rigid with said reel and adapted to rotate therewith, a ratchet wheel fixed on said extension, a pawl pivotally mounted on said frame and adapted to be brought into and out of engagement with said ratchet wheel to respectively prevent and permit rotation of the latter and of the reel in the reeling-in direction, means for pivotally mounting said pawl on said frame, a lever pivoted to said frame and having one end operatively connected with said pawl, a brake element supported by said frame for movement into and out of frictional contact with a portion of said rotatable reel, said lever being swingable to withdraw said pawl from engagement with said ratchet wheel and to move a further distance beyond said pawl-withdrawing movement, said brake element disposed in the path of further movement of said lever and adapted to be pressed into frictional engagement with the reel by such further movement.

5. A fishing reel assembly of the class described comprising, in combination, a supporting frame adapted to be attached to a fishing rod or the like, a reel rotatably mounted on said frame and adapted to carry the fishing line, a hand crank and means operatively connecting said crank to said reel for rotating it in either reeling-in or paying-out directions, an axial extension rigid with said reel and adapted to rotate therewith, a ratchet wheel fixed on said extension, a pawl pivotally mounted on said frame and adapted to be brought into and out of engagement with said ratchet wheel to respectively prevent and permit rotation of the latter and of the reel in the reeling-in direction, means for pivotally mounting said pawl on said frame, a lever pivoted to said frame and a link connecting one end of said lever with said pawl, a brake element supported by said frame for movement into and out of frictional contact with a portion of said rotatable reel, said lever being swingable to withdraw said pawl from engagement with said ratchet wheel and to move a further distance beyond said pawl-withdrawing movement, said brake element disposed in the path of further movement of said lever and adapted to be pressed into frictional engagement with the reel by such further movement, and means carried by said lever for engagement by the fishing line whereby the lever may be actuated to perform both of its described functions upon the tautening of the line by the catch.

6. A fishing reel assembly of the class described comprising, in combination, a supporting frame adapted to be attached to a fishing rod or the like, a reel rotatably mounted on said frame and adapted to carry the fishing line, a hand crank and means operatively connecting said crank to said reel for rotating it in either reeling-in or paying-out directions, an axial extension rigid with said reel and adapted to rotate therewith, a clutch element fixed on said extension, a sleeve rotatably and slidably mounted on said extension, a convolute spring having its outer end attached to the frame and its inner end portion secured to said sleeve and adapted to be wound thereon, a mating clutch element on said sleeve, and means for moving said sleeve along said extension to inter-engage the clutch elements and thus operatively connect the spring to the reel, whereby the spring will be wound up and energy stored when the reel is rotated in one direction and may be released to rapidly rotate the reel in the other direction.

7. The fishing reel assembly set forth in claim 6 in which a ratchet wheel is provided upon the reel extension and a pawl is pivoted upon said frame, and means are provided to operate the pawl and engage it with the ratchet wheel to prevent rotation of the reel in the paying-out direction, especially when the spring is wound up.

8. The fishing reel assembly set forth in claim 7 in which there is provided a brake shoe adapted to be frictionally applied to the reel to retard its rotation, means movably supporting said brake shoe, the construction and arrangement being such that movement of the pawl operating means during at least a portion of its travel serves to move the brake supporting means to apply the brake.

9. The fishing reel assembly set forth in claim 7 in which there is provided a brake shoe adapted to be frictionally applied to the reel to retard its rotation, an inclined supporting member for said brake shoe pivoted with respect to the frame and disposed in the path of movement of the pawl operating means, the construction and arrangement being such that movement of the pawl operating means during at least a portion of its travel serves to cam the brake supporting member to apply the brake.

10. The fishing reel assembly set forth in claim 6 in which locking means is provided for preventing winding-in movement of the reel under the influence of the spring, and in which there is provided a brake for the reel, and a common actuating means for the locking means and the brake.

11. A fishing reel assembly of the class described comprising, in combination, a supporting frame adapted to be attached to a fishing rod or the like, a reel rotatably mounted on said frame and adapted to carry the fishing line, a hand crank and means operatively connecting said crank to said reel for rotating it in either reeling-in or paying-out directions, an axial extension rigid with said reel and adapted to rotate therewith, a jaw clutch element fixed on said extension, a sleeve rotatably and slidably mounted on said extension, a convolute spring having its outer end swivelled to the frame and its inner end portion secured to said sleeve and adapted to be wound thereon, a mating jaw clutch element on said sleeve, and manually operable means for moving said sleeve along said extension to engage the clutch elements and thus operatively connect the spring to the reel, whereby the spring will be wound up and energy stored when the reel is rotated in the line paying-out direction and may be released to rapidly rotate the reel in the reeling-in direction.

12. A fishing reel assembly of the class described comprising, in combination, a supporting frame adapted to be attached to a fishing rod or the like, a reel rotatably mounted on said frame and adapted to carry the fishing line, a hand crank and means operatively connecting said crank to said reel for rotating it in either reeling-in or paying-out directions; an axial extension rigid with said reel and adapted to rotate therewith, a ratchet wheel fixed directly on said extension; a pawl pivotally mounted on said frame and adapted to be brought into and out of engagement with said ratchet wheel to respectively prevent and permit rotation of the latter and of the reel in the reeling-in direction, means resiliently biasing said pawl toward ratchet engaging position; spring means normally disengaged from said reel, means for positively engaging said spring means with said reel and disengaging it therefrom, whereby rotation of said reel in the unwinding direction after such engagement will stress the spring means to urge the reel in the reeling-in direction; a lever pivoted to said frame and having portions thereof operatively connected respectively with said pivoted pawl and with the fishing line, whereby upon movement of said lever by the tautening of said line the pawl will be disengaged from said ratchet wheel and the reel permitted to rotate; and a cam element slidably carried by said frame and adapted normally to be in contact directly with said pawl in opposition to the urging of said resilient biasing means, whereby manual movement of said cam element will serve to move said pawl into engagement with said ratchet and permit the removal of the same, under the control of the fingers of the operator.

FREDERICK W. SCHNEPEL.

REFERENCES CITED

The following references are of record in the file of this patent:

UNITED STATES PATENTS

| Number | Name | Date |
|---|---|---|
| 278,867 | Bryan | June 5, 1883 |
| 730,457 | Howe | June 9, 1903 |
| 1,177,885 | Molnar | Apr. 4, 1916 |
| 1,662,347 | Stocking | Mar. 13, 1928 |
| 1,892,541 | Smelser | Dec. 27, 1932 |
| 1,975,385 | Bachus | Oct. 2, 1934 |
| 2,310,654 | Sanborn | Feb. 9, 1943 |

FOREIGN PATENTS

| Number | Country | Date |
|---|---|---|
| 790,537 | France | Sept. 9, 1935 |